(12) United States Patent
Brown et al.

(10) Patent No.: US 8,913,596 B2
(45) Date of Patent: Dec. 16, 2014

(54) METHOD AND DEVICE FOR REGULATING SENDING IN A WIRELESS TELECOMMUNICATION NETWORK

(75) Inventors: Patrick Brown, Cagnes sur Mer (FR); Jérôme Galtier, Nice (FR)

(73) Assignee: Orange, Paris (FR)

( * ) Notice: Subject to any disclaimer, the term of this patent is extended or adjusted under 35 U.S.C. 154(b) by 318 days.

(21) Appl. No.: 12/864,913

(22) PCT Filed: Jan. 30, 2009

(86) PCT No.: PCT/FR2009/050142
§ 371 (c)(1),
(2), (4) Date: Sep. 7, 2010

(87) PCT Pub. No.: WO2009/095628
PCT Pub. Date: Aug. 6, 2009

(65) Prior Publication Data
US 2010/0322220 A1    Dec. 23, 2010

(30) Foreign Application Priority Data

Feb. 1, 2008  (FR) ..................... 08 50654

(51) Int. Cl.
*H04W 4/00*   (2009.01)
*H04W 74/00*  (2009.01)
*H04W 74/02*  (2009.01)
*H04W 74/08*  (2009.01)

(52) U.S. Cl.
CPC ............ *H04W 74/002* (2013.01); *H04W 74/02* (2013.01); *H04W 74/0841* (2013.01); *H04W 74/0833* (2013.01)

USPC ..................... 370/338; 370/445; 370/462

(58) Field of Classification Search
None
See application file for complete search history.

(56) References Cited

U.S. PATENT DOCUMENTS

| | | | | |
|---|---|---|---|---|
| 3,752,922 A | * | 8/1973 | Burke | 375/303 |
| 7,274,676 B2 | * | 9/2007 | Cardei et al. | 370/328 |
| 7,586,932 B2 | * | 9/2009 | Chou et al. | 370/445 |
| 7,930,617 B1 | * | 4/2011 | Gass et al. | 714/784 |
| 2002/0150048 A1 | * | 10/2002 | Ha et al. | 370/231 |

(Continued)

FOREIGN PATENT DOCUMENTS

WO    WO 2007/051946 A1    5/2007

OTHER PUBLICATIONS

Abichar et al., "CONTI: Constant-Time Contention Resolution for WLAN Access," Proceedings of IFIP Networking Conference, LCS 3462, Waterloo, Canada, pp. 358-369 (May 2-6, 2005).

(Continued)

*Primary Examiner* — Bunjob Jaroenchonwanit
(74) *Attorney, Agent, or Firm* — Drinker Biddle & Reath LLP (57) ABSTRACT

A method of regulating sending of data packets, implemented by a station having at least one data packet to be sent via a wireless communication network, includes at least one step of obtaining a binary value representative either of an authorization to send, or of a prohibition to send, a step of sending the packet, the sending step being executed on condition that at least one criterion relating to the binary value or values obtained is satisfied, where the binary value or values are dependent on an index value assigned randomly to the station and a class of packets to which the packet to be sent belongs.

8 Claims, 4 Drawing Sheets

(56) References Cited

U.S. PATENT DOCUMENTS

| | | | |
|---|---|---|---|
| 2003/0161340 A1* | 8/2003 | Sherman | 370/445 |
| 2004/0068587 A1* | 4/2004 | Le Leannec et al. | 709/247 |
| 2004/0264423 A1* | 12/2004 | Ginzburg et al. | 370/338 |
| 2005/0163140 A1* | 7/2005 | Dally et al. | 370/412 |
| 2005/0232208 A1* | 10/2005 | Hansen | 370/338 |
| 2006/0114867 A1* | 6/2006 | Du et al. | 370/338 |
| 2007/0076741 A1* | 4/2007 | Lee et al. | 370/445 |
| 2008/0095149 A1* | 4/2008 | Dai | 370/389 |
| 2009/0103501 A1* | 4/2009 | Farrag et al. | 370/337 |
| 2012/0008608 A1* | 1/2012 | Iacono et al. | 370/338 |

OTHER PUBLICATIONS

Abichar et al., "Group-Based Medium Access for Next-Generation Wireless LANs," International Symposium on World of Wireless, Mobile and Multimedia Networks, 2006, Wowmom 2006, Buffalo-Niagara Falls, NY, USA, Jun. 26-29, 2006, Piscataway, NJ, USA, IEEE, pp. 35-41 (Jun. 26, 2006).

Galtier, "Analysis and optimization of MAC with constant size congestion window for WLAN," Second International Conference on Systems and Networks Communications, 2007, ICSNC 2007, IEEE, PI, pp. 1-6 (Aug. 1, 2007).

Siwamogsatham, "A Novel Smart-DCF Scheme for High-Speed WLANs," International Symposium on Communications and Information Technologies, 2007, ISCIT'07, IEEE, PI, pp. 1032-1037 (Oct. 1, 2007).

* cited by examiner

METHOD AND DEVICE FOR REGULATING SENDING IN A WIRELESS TELECOMMUNICATION NETWORK

CROSS-REFERENCE TO RELATED APPLICATIONS

This application is the U.S. national phase of the International Patent Application No. PCT/FR2009/050142 filed Jan. 30, 2009, which claims the benefit of French Application No. 08 50654 filed Feb. 1, 2008, the entire content of which is incorporated herein by reference.

FIELD OF THE INVENTION

The present invention relates to the field of wireless telecommunication networks, in particular wireless local area networks ("WLANs") in accordance with the family of IEEE 802.11 standards.

BACKGROUND

Such networks are also dubbed Wi-Fi networks. They are used, in numerous applications, to network stations (for example computers, personal assistants and peripherals).

The 802.11 standard defines in the document "IEEE 802.11a-1999, IEEE 802.11b-1999, IEEE-802.11d-2001, Part 11: wireless LAN medium access control (MAC) and physical layer (PHY) specifications" a method for regulating the traffic in the wireless network. This method uses a system of congestion windows (Congestion Window "CW") to regulate this traffic. According to this standard, to determine the instant at which to send a data packet, a station draws a random number between 0 and CW−1, the value CW being an integer lying between two values $CW_{min}$ and $CW_{max}$ specified by the 802.11 standard.

This value CW serves as backward counter for the sending of the packet, this counter being deferred if the station finds that another station is currently sending. Unfortunately, this congestion windows system generates a significant number of collisions on the wireless network, thereby resulting, from the user's point of view, in a significant loss of bandwidth.

Another mechanism known by the name "tournament scheme" may be used by the various stations to regulate packet sending and limit the collision rate. This tournament scheme is described in the document by the authors Z. Abichar and M. Chang, entitled "CONTI: Constant Time Contention Resolution for WLAN Access", IFIP Networking 2005.

The tournament scheme consists in organizing a sort of tournament between the stations having to send a packet. A tournament is composed of a certain number of selection rounds, each executed for a time interval of predefined duration allowing each station to have time to hear the sending of any other. This duration can typically be equal to the duration of the time interval dubbed the "SlotTime" which, according to the IEEE 802.11 standard, is defined as elementary interval in the contention resolution procedure based on congestion windows. At the start of the tournament, all the stations having to send a packet may be permitted to send this packet. At each selection round, one or more stations may be deleted from the list of stations permitted to send, depending on whether a permission or a prohibition to send is allotted to them during this selection round. On completion of the tournament, only the non-eliminated stations are permitted to send. If several stations are still in the running on completion of the tournament, they send at the same time thus causing a collision and therefore disturbed reception with the impossibility of correctly receiving the data packets sent. These stations will then have to participate in the next tournament to attempt to send these packets again.

In the case of the sending of data streams requiring priority access to the network or a high bandwidth, the requirement is apparent to provide a solution for regulating sending making it possible to guarantee a level of performance in terms of bandwidth or throughput as well as a quality of service.

The current solution, compatible with the IEEE 802.11e standard, consists in increasing the probability that a priority stream accesses the radio medium before the others. Now, this simplistic solution does not make it possible to guarantee that a station having to send a priority stream accesses the radio medium in a predefined time, or that sufficient bandwidth is at its disposal. Furthermore, this solution does not make it possible to guarantee a minimum level of performance to the other stations having to send streams of lower priority, since no measure is taken for these other stations.

There is therefore no equitable mechanism for sharing access to the network between various user stations which are usable with the mode of access according to the 802.11e standard or the mode of access according to the tournament scheme.

SUMMARY

One of the aims of the invention is to remedy inadequacies and drawbacks of the prior art and/or to afford improvements thereto.

More precisely, the invention relates to a method for regulating sending implemented by a station having at least one data packet to be sent via a wireless communication network, the method comprising at least one step of obtaining a binary value representative either of a permission to send, or of a prohibition to send, a step of sending said packet, said sending step being executed on condition that at least one criterion relating to the binary value or values obtained is satisfied, the binary value or values are dependent on an index value assigned randomly to said station and on a packet class to which the packet to be sent belongs.

The method according to the invention takes into account the membership class of a packet to determine how to allocate the permissions or prohibitions to send in the course of a tournament, while preserving, by using a randomly assigned index value, a statistical mechanism for assigning these permissions and prohibitions to send.

It is thus possible to control class by class the probability that a station sends a packet. In particular, it is possible to favor one packet class with respect to another and therefore to put in place a scheme for managing priorities between classes. In this way, the method can be adapted for each packet class according to the requirement specific to a class.

According to one embodiment, said index value is determined by drawing a value of a random variable taking its values in a common interval of index values shared by all the packet classes. A simple mechanism for drawing a random value makes it possible to determine an index value on the basis of which the behavior of the station in the course of a tournament is determined, that is to say the various binary values representative of permissions or of prohibitions to send.

According to one embodiment, the method according to the invention comprises a step of identifying, from among a list of sub-intervals of values which is associated with said class of packets, a sub-interval of values in which said index value lies and on the basis of which the binary value or values are determined. This relies on the finding made by the inventors that the probability that a station sends on completion of the tournament can be represented by a unique index value taking its values in a given interval of values, and that with a sub-interval of this interval can therefore be associated a behavior in the course of a tournament. The sub-interval list is for example defined in the guise of a partition into sub-intervals of an index value interval in which the allotting of the index values is performed.

According to one embodiment, a priority level is assigned for a given time period to said class of packets, the list of sub-intervals of values which is associated with said class being dependent on the priority level customarily assigned to said class. The method according to the invention is compatible with various schemes for managing priority aimed at allotting a time-varying priority level to a given class.

Correlatively, the subject of the invention is a device for regulating sending for a station having at least one data packet to be sent via a wireless communication network, the device comprising     means for determining at least one binary value representative either of a permission to send, or of a prohibition to send,     sending means configured to send a packet on condition that at least one criterion relating to the value or values obtained is satisfied,     the device being characterized in that the determining means are configured to determine the binary value or values as a function of an index value assigned randomly to said station and of a packet class to which the packet to be sent belongs.

The advantages stated for the method according to the invention are directly transposable to the device according to the invention.

According to a preferred implementation, the various steps of the method according to the invention are implemented by computer software or a computer program, this software comprising software instructions intended to be executed by a data processor of a packet sending station and designed to control the execution of the various steps of this method.

Consequently, the invention is also aimed at a program that may be executed by a computer or by a data processor, this program comprising instructions for controlling the execution of the steps of a method such as mentioned above.

This program can use any programming language, and be in the form of source code, object code, or of code intermediate between source code and object code, such as in a partially compiled form, or in any other desirable form.

The invention is also aimed at an information carrier readable by a computer or data processor, and comprising instructions of a program such as mentioned above.

The information carrier can be any entity or device capable of storing the program. For example, the carrier can comprise a storage means, such as a ROM, for example a CD ROM or a microelectronic circuit ROM, or else a magnetic recording means, for example a diskette (floppy disk) or a hard disk.

Moreover, the information carrier can be a transmissible carrier such as an electrical or optical signal, which can be conveyed via an electrical or optical cable, by radio or by other means. The program according to the invention can in particular be downloaded from a network of Internet type.

Alternatively, the information carrier can be an integrated circuit into which the program is incorporated, the circuit being adapted for executing or for being used in the execution of the method in question.

According to another implementation, the invention is implemented by means of software and/or hardware components. In this regard, the term module can correspond in this document either to a software component or to a hardware component. A software component corresponds to one or more computer programs, one or more subroutines of a program, or in a more general manner to any element of a program designed to implement a function or a set of functions. A hardware component corresponds to any element of a hardware assembly designed to implement a function or a set of functions.

BRIEF DESCRIPTION OF THE DRAWINGS

Other aims, characteristics and advantages of the invention will be apparent through the description which follows, given solely by way of nonlimiting example and by reference to the appended drawings in which.

DETAILED DESCRIPTION

Figure 1:
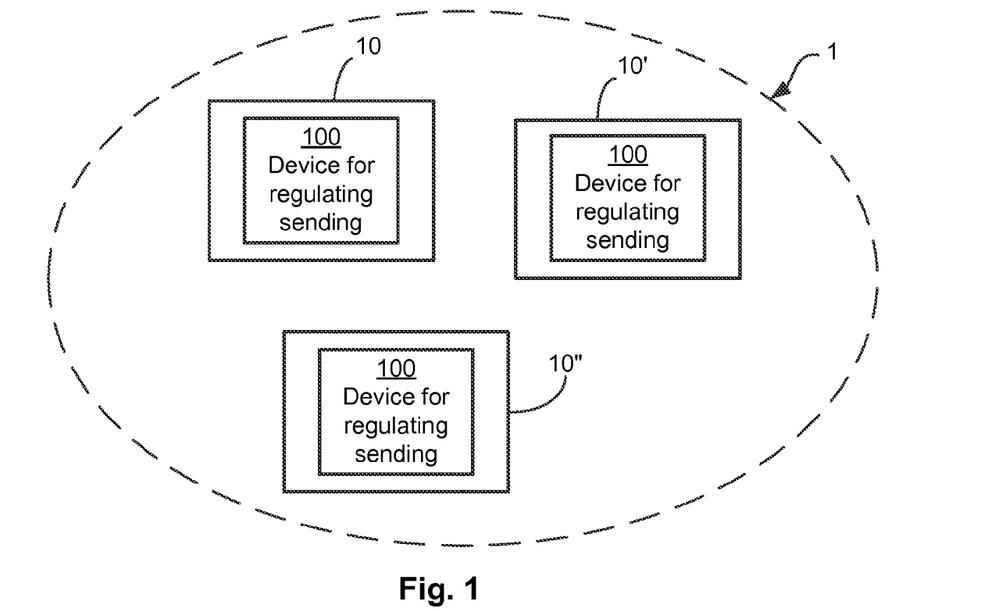
FIG. 1 represents a wireless telecommunication network with stations in accordance with the invention in a preferred embodiment.

FIG. 1 represents a wireless telecommunication network 1 in which stations 10, 10', 10" in accordance with the invention are deployed. Each of these stations 10 comprises a device 100 for regulating sending in accordance with the invention.

Figure 2:
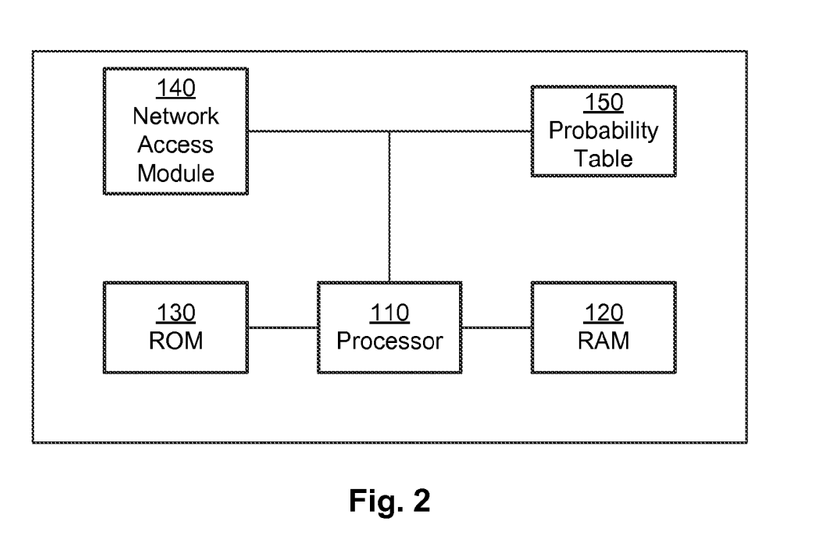
FIG. 2 represents a device for regulating sending in accordance with the invention in a preferred embodiment.

In the mode illustrated in FIG. 2, the device 100 according to the invention comprises a processor 110, a random access memory 120, a read-only memory of ROM type 130, a module 140 for access to the network 1, so as to send and receive packets and signals in the wireless telecommunication network 1 and a probability table 150. These various elements are linked together by a bus system, not referenced. The means 140 for dispatching and receiving data packets and signals on the wireless telecommunication network 1 consist, in the example described here, of a card for access to the network 1 in accordance with the family of IEEE 802.11 standards.

For the implementation of the invention, use is made of the tournament scheme cited in the introduction.

In the tournament scheme, such as described by CONTI in the document referenced above, the permissions or prohibitions to send are allotted to the stations using binary random variables having a Bernoulli distribution law. This distribution law is defined by a probability of drawing a permission to send. Such a probability is thus assigned to each station and to each selection round. The probabilities are preferably chosen in such a way that statistically the collision rate is as low as possible. A procedure for choosing the probabilities in an optimal manner is presented in the document "Analysis and optimization of mac with constant size congestion window for WLAN", by J. Galtier, Proceedings on the Third International Conference on Services and Networks communications", INRIA, Library of Congress Number 2007930108, August 2007.

According to a particular embodiment, described in the patent document WO2007/051946, the probabilities assigned to the various stations during a selection round can depend on the permissions or prohibitions to send drawn in the previous selection rounds, so as to minimize the collision rate.

The stations 10, 10', 10" each comprise a sending management module which allows the implementation of a method for regulating sending.

In the subsequent description the following notation will be used:

k is the index identifying the selection round in the course of a tournament;
$k_{max}$ is the maximum number of selection rounds for a tournament;
r is a binary random variable;
r(k) is the value of the binary random variable r drawn in the selection round of index k; r(k) belongs to the set {0,1}, the value "1" usually being representative of a permission to send, while the value "0" is representative of a prohibition to send.

Figure 3:
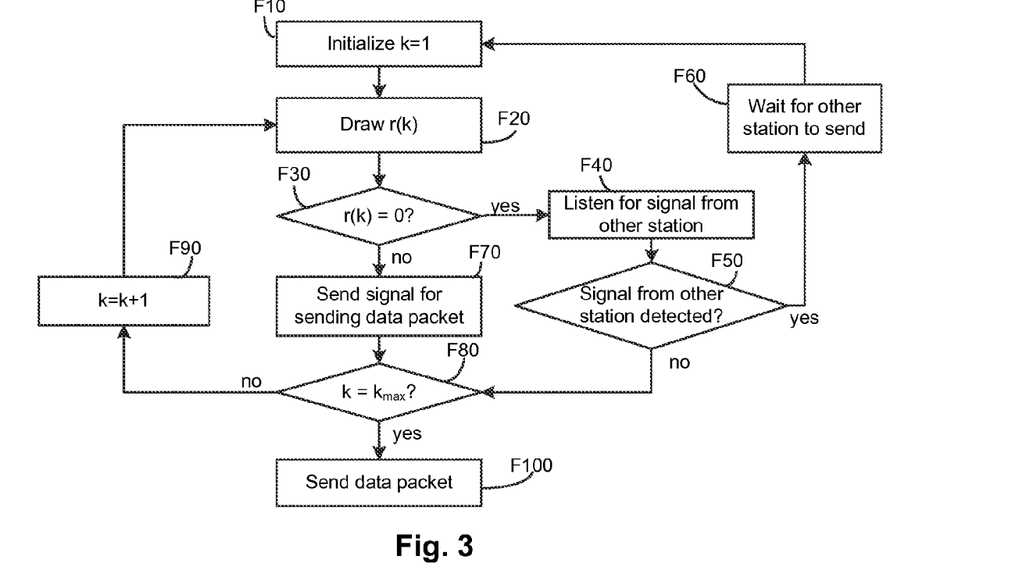
FIG. 3 represents, in flowchart form, the main steps of a method for regulating sending known in the prior art.

The main steps F10 to F100 of a method for regulating sending according to the known tournament scheme are described with reference to FIG. 3. This method is implemented by the sending management module of a station 10 having a data packet to be sent through the network 1. All the stations having a data packet to be sent implement this same method simultaneously, without mutual consultation or interrogation, other than what is described in the steps described below, i.e. necessary between these stations.

The method is described for a station 10. It corresponds to what is called a tournament: it is repeated by each station as long as it has packets to be sent. The stations having packets to be sent all run, at the same instant, the contention resolution procedure by implementation of a tournament, this instant being dependent on a criterion analogous to that used for the congestion window system according to the IEEE 802.11 standard, that is to say after a predefined time period DIFS1 (which can be different from the DIFS (DCF Inter Frame Space) time period defined in the 802.11 standard).

In the course of a first step F10, the station 10 initializes a variable k to the value 1, this variable representing the index of the current selection round.

This initialization step F10 is followed by a step F20 of drawing a value r(k) of a binary random variable r, associated with the station for the current selection round of index k. The probability that this binary random variable r(k) takes, in the selection round of index k, the predetermined value "1" is denoted p(k). According to one embodiment, this probability p(k) depends on the values drawn in the previous selection rounds. The probability that this binary random variable r(k) takes, in round k, the predetermined value "0" is therefore (1−p(k)).

This step F20 of drawing a random variable value is followed by a step F30 in the course of which a check is made to verify whether the binary value r(k) drawn is equal to "0".

If such is the case (case of a prohibition to send), this test F30 is followed by a step F40 in the course of which the station 10 listens to the wireless telecommunication network to determine whether another station 10', 10" has sent a signal indicating that this other station 10', 10" wishes to send a data packet.

If such a signal is detected (result of the test of step F50 positive), the method terminates with step F60, without the station 10 having sent its data packet. In the course of this step F60, the station 10 waits for the end of the selection rounds and the possible sending of a packet by another station 10', 10" before again executing the initialization step F10 already described.

On the other hand, if in step F40 no signal is detected (result of the test of step F50 negative), this test is followed by a test in step F80 in the course of which it is determined whether the round k is the last selection round, this amounting to verifying whether the variable k is equal to the value $k_{max}$. If such is the case, the station 100 sends its data packet in the course of a step F100.

On the other hand, if k is strictly less than $k_{max}$, the result of the test of step F80 is negative. This step is then followed by a step F90 in the course of which the value of the variable k is incremented by one unit, with a view to the execution of the next selection round.

If in the course of the test of step F30 it is determined that the binary value drawn is equal to the predetermined value 1 (case of a permission to send), this test F30 is followed by a step F70 of sending a signal indicating that the station 100 wishes to send a data packet over the network.

This step F70 of sending a signal is followed by step F80 already described in the course of which a check is made to verify whether the current selection round k is the last selection round. If such is the case, this test F80 is followed by step F100 of sending the data packet by the station 10. On the other hand, if such is not the case, this test F80 is followed by the incrementation step F90 already described.

The incrementation step F90 is followed by a new execution of steps F20 to F80 already described, for the next selection round and according to the logical chain for stringing the steps together which has just been described.

The method and the device according to the invention are now described in greater detail. As already mentioned in the introduction to the present patent application, the invention calls upon the concept of packet class. The concept of packet class used in this document should be interpreted in the broad sense.

By way of example, the IEEE 802.11 standard defines eight packet classes dubbed respectively "Control" (control packets), "Voice" (packets belonging to a stream transmitting voice), "Audio" (packets belonging to an audio stream), "Class 1", "Class 2", "Class 3", "Class 4" and "Best Effort". A class of this standard corresponds to a stream category having specific requirements in terms of quality of service: a minimum bandwidth, a low transmission error rate, etc.

Other ways of defining packet classes are also conceivable. These classes can in particular be defined as a function of any characteristic parameter of the packet or of the stream to which this packet belongs: for example as a function of the size of the packet, as a function of the priority level of the packet, as a function of the duration of the communication stream to which the packet belongs, as a function of the origin or of the destination of the packet, etc.

The invention is applicable to any packet classification system, provided that the membership class of a packet can be determined or obtained in one way or another by the station having this packet to be sent. The invention makes it possible to process in a differentiated manner the various defined classes, while guaranteeing for each of these classes a quality of service in terms of bandwidth and equity of processing.

Figure 5:
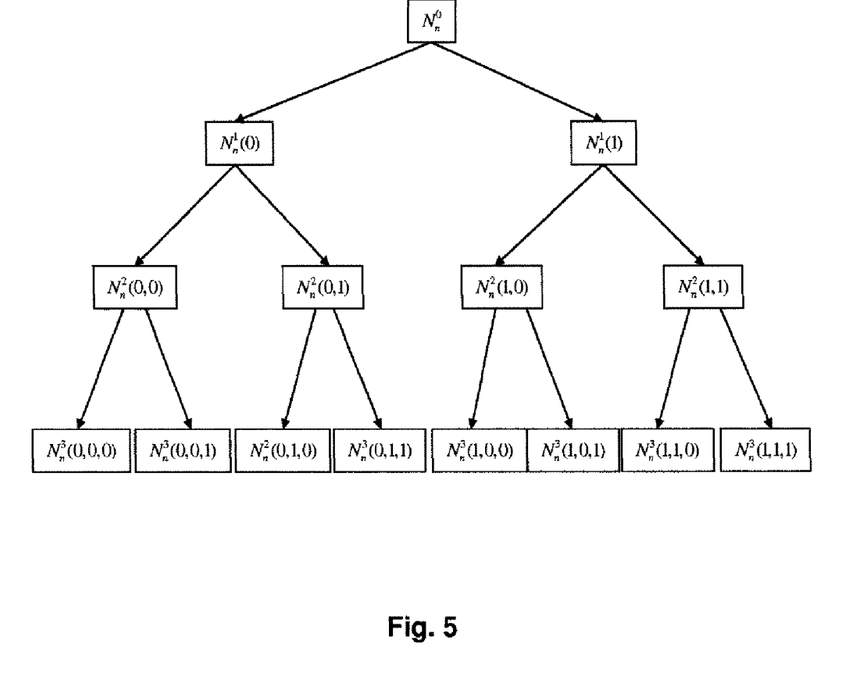
FIG. 5 represents a first probability tree illustrating the implementation of a method for regulating sending known in the prior art.

FIG. 5 illustrates a simplified situation in which all the stations have to send packets belonging to one and the same packet class denoted n, these packets having to be processed with the same priority level.

The progressive mechanism for eliminating the stations is illustrated in this figure by a tree-like inter-state transition graph. In this tree, a node represents a possible state, a link between two nodes indicating a possible transition between these two states. The tree represents the possible succession of states of a station during a tournament. A wireless node or terminal node is called a leaf node.

At the start of the tournament, a station having a packet to be sent is in the initial state represented by the root node. Then in each selection round, according to the value 0 or 1 drawn, the station is in a new state, represented by a child node situated at the next depth level and linked to the previous node. The total number of depth levels of the tree is thus equal to the maximum number $k_{max}$ of selection rounds in one and the same tournament. In the example given in FIG. 5, the total number of depth levels is $k_{max}=3$. A station that is in the state represented by a leaf node and which therefore has not been eliminated during the previous selection rounds of the tournament will send its data packet (step 100).

With each node of the tree is associated a probability. The tree therefore forms a probability tree. The root node of the tree is identified by $N^0$: it corresponds to the initial state of the station at the start of the tournament. With this root node $N^0$ is associated the probability $p_n^0$ of drawing the value "1" for the binary random variable r in the first selection round 1. This probability is the same for all the stations having a packet to be sent a packet belonging to class n.

In the case of drawing a value "1" in the first selection round, the station is in a new state represented by the node identified by $N^1(1)$. In the case of drawing a value "0" in the first selection round, the station is in a new state represented by the node identified by $N^1(0)$.

In the second selection round, when the station is in the state represented by the node identified by $N^1(1)$, the probability of drawing the value "1" is $p_n^1(1)$. Likewise, when the station is in the state represented by the node identified by $N^1(0)$, the probability of drawing the value "1" is $p_n^1(0)$.

By generalizing to an arbitrary selection round of index k, we write $p_n^k(r(1), \ldots, r(k))$ for the probability, associated with the node $N^k(r(1), \ldots, r(k))$ and with the class n, of drawing the value "1" for the binary random variable r in the selection round of index k+1, knowing that the values $r(1), \ldots r(k)$ have been drawn successively in selection rounds 1 to k.

A binary value $E^k(r(1), \ldots, r(k))$ equal to 1 if the node $N^k(r(1), \ldots, r(k))$ is a leaf node and equal to 0 in the converse case is furthermore associated with each node $N^k(r(1), \ldots, r(k))$.

We define a function $V_n^k$, associated with class n, assigning to a node $N^k(r(1), \ldots, r(k))$ a real value included in the interval [0,1]. This function $V_n^k$ is defined by recurrence:

for k=0, $$V_n^0 = 1$$

for k=1, $V_n^1(1) = p_n^0(1)$ where $p_n^0(1)$ is the probability associated with the node $N^0(1)$, $V_n^1(0) = 1 - p_n^0(1)$ for k>1, $$V_n^k(r(1), \ldots, r(k-1), 1) = V_n^{k-1}(r(1), \ldots, r(k-1)) p_n^{k-1}(r(1), \ldots, r(k-1))$$

$$V_n^k(r(1), \ldots, r(k-1), 0) = V_n^{k-1}(r(1), \ldots, r(k-1))(1 - p_n^{k-1}(r(1), \ldots, r(k-1)))$$

$V_n^k(r(1), \ldots, r(k))$ also represents the probability that a station is in the state represented by the node $N^k(r(1), \ldots, r(k))$ on completion of k selection rounds.

By way of example, it is assumed that the probabilities $p_n^k(r(1), \ldots, r(k))$ assigned to the nodes represented in FIG. 5 have the following values annexed in chart 1. In this example, the probabilities $V_n^k(r(1), \ldots, r(k))$ associated with these same nodes have the values annexed in chart 2.

An order relation between the nodes of a tree is defined by recurrence:
 for k=1, it is decided that the node $N^1(0)$ is "lower" than the node $N^1(1)$ and we write $N^1(0) < N^1(1)$;
 the child nodes of the nodes $N^1(0)$ and $N^1(1)$ inherit the order relation defined for the nodes $N^1(0)$ and $N^1(1)$: any node having $N^1(0)$ as parent node in the tree (that is to say all the nodes $N^k(r(1), \ldots, r(k))$ such that r(1)=0, for $1 \leq k \leq k_{max}$) is lower than any one of the nodes having $N^1(1)$ as parent node (that is to say all the nodes $N^k(r(1), \ldots, r(k))$ such that r(1)=1, for $1 \leq k \leq k_{max}$);
 for k>1, $N^k(r(1), \ldots, r(k-1), 0) < N^k(r(1), \ldots, r(k-1), 1)$
 the child nodes of the nodes $N^k(r(1), r(k-1), 0)$ and $N^k(r(1), \ldots, r(k-1), 1)$ also inheriting this order relation.

Very intuitively, it is understood that a first station that is in the state represented by the node $N^1(1)$ will win the tournament versus a second station that is in the state represented by the node $N^1(0)$, since the second station is eliminated after having drawn a value "0", in particular because the first station has itself drawn a value "1" permitting it to remain in the running in the tournament. The same holds for the nodes attached to the node $N^1(1)$ in relation to the nodes attached to the node $N^1(0)$.

By generalizing this finding, the order relation such as defined allows for the fact that a first station that is in the state represented by a first node N1 will win the tournament versus a second station that is in the state represented by a second node N2 when N1>N2. Stated otherwise, a node N1 of the tree is higher than a node N2, if node N1 corresponds to the state of a station having drawn the corresponding sequence $r(1), \ldots, r(k)$ ensuring that it sends before a station having drawn the sequence $r'(1), \ldots, r'(k)$ corresponding to node N2.

It is therefore possible to utilize this property to guarantee that the stations, having to send packets belonging to a class that must be processed with a higher priority level than that with which the packets belonging to another class are processed, are served by priority. More generally, the assignment of certain parts of the tree to certain classes makes it possible to favor certain classes with respect to others.

Figure 6:
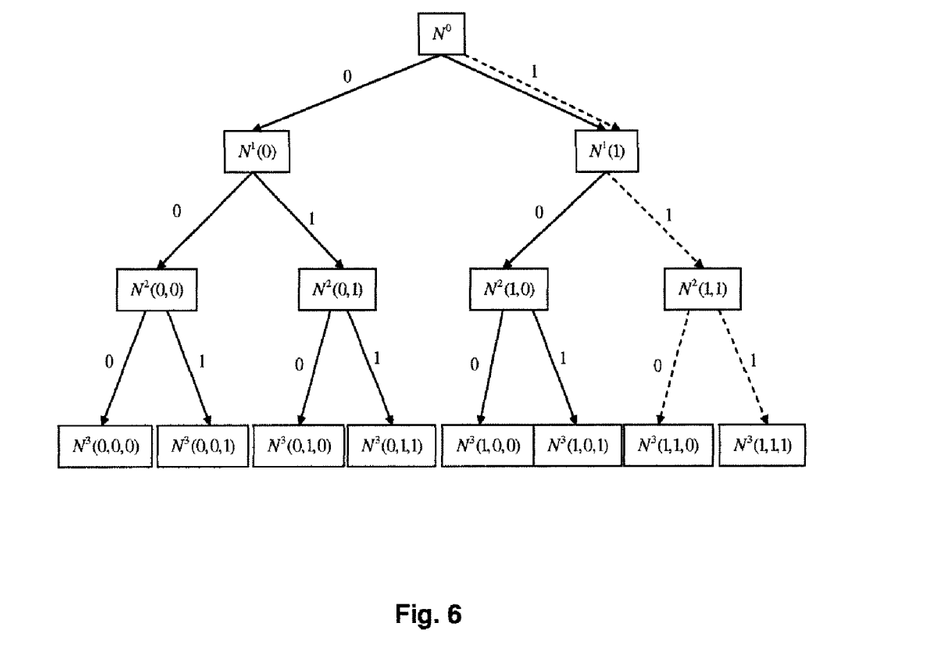
FIG. 6 represents a first probability tree illustrating the implementation of a method for regulating sending according to the invention.

FIG. 6 represents an exemplary tree illustrating a progressive mechanism for eliminating the stations when two classes n1 and n2 are possible for the packets to be sent by these stations. In this case, the drawing probabilities associated with each node depend on the membership class of the packet to be sent.

In FIG. 6, the solid lines represent the transitions permitted for a station having to send a packet of class n1 and the dashed lines the transitions permitted for a station having to send a packet of class n2. $N^1(1)$ The tree formed by the set of nodes $N^k(r(1), \ldots, r(k))$ for $0 \leq k \leq 3$ thus comprises two parts:
 a first part, associated with the class n2, comprising the nodes $N^0$, $N^1(1)$, $N^2(1,1)$, $N^3(1,1,0)$ and $N^3(1,1,1)$;
 a second part, associated with the class n1, comprising the nodes $N^0$, $N^1(0)$, $N^1(1)$, $N^2(0,0)$, $N^2(0,1)$, $N^2(1,0)$, $N^3(0,0,0)$, $N^3(0,0,1)$, $N^3(0,1,0)$, $N^3(0,1,1)$, $N^3(1,0,0)$, $N^3(1,0,1)$.

The parts of the tree that are assigned to a given class can be determined simply by assigning different probabilities to the nodes of this tree, in particular by prohibiting, for a station having to send a packet belonging to this class, by means of a value of probabilities fixed at "1" (or, respectively, at "0"), access to the states corresponding to certain parts of the tree.

In the example described here with reference to FIG. 6, the value of the probability $p_{n2}^0$ associated with the root node $N^0$ in the case of a packet of class n2 is equal to 1. Consequently no transition will ever be performed between the state represented by the root node $N^0$ and the next state represented by the node $N^1(0)$ for a station having to send a packet of class n2. To indicate this, no dashed line is indicated in FIG. 6 between the root node $N^0$ and the next state represented by the node $N^1(0)$.

Likewise, the value of the probability $p_{n2}^1(1)$ associated with the node $N^1(1)$ in the case of a packet of class n2 is equal to 1. Consequently no transition will ever be performed between the state represented by the node $N^1(1)$ and the next state $N^2(1,0)$. To indicate this, no dashed line is drawn in FIG. 6 between the node $N^1(1)$ (1) and the next state $N^2(1,0)$.

Symmetrically, because the value of the probability $p_{n1}^1(1)$ associated with the node $N^1(1)$ in the case of a packet of class n1 is equal to 0, no transition will ever be performed between the state represented by the node $N^1(1)$ and the next state $N^2(1,1)$. To indicate this, no solid line is drawn in FIG. 6 between node $N^1(1)$ and the next state $N^2(1,1)$.

Ultimately, starting from the state represented by the node $N^0$ of the tree, a station having to send a priority packet n1 can only attain the six final states represented by the nodes $N^3(0,0,0)$, $N^3(0,0,1)$, $N^3(0,1,0)$, $N^3(0,1,1)$, $N^3(1,0,0)$, $N^3(1,0,1)$. Likewise, starting from the state represented by the root node $N^0$ of the tree, a station having to send a priority packet n2 can only attain just the two final states represented by the nodes $N^3(1,1,0)$, $N^3(1,1,1)$.

In conclusion, choosing the probabilities assigned to the various nodes makes it possible to manage various classes of packets and to control the assignment of the nodes of the tree to these various classes.

It then suffices to compel a station, having to send a data packet belonging to a class to be processed by priority, to use as probabilities a set of probabilities guaranteeing that it reaches the states represented by the rightmost leaf nodes of the tree. It will win the tournament versus another station using as probability a set of probabilities guaranteeing that it reaches the leftmost leaves of the tree.

The invention furthermore proposes a simple mechanism for allotting a suite of values r(1) to r(k) to a station having a data packet to be sent, as a function of the class to which this packet belongs, the values r(1) to r(k) being deduced from an index value A assigned to the station.

This mechanism relies on the finding that the behavior of a station in the tournament, that is to say the succession of the states of this station in the course of the tournament, can be defined in a one-to-one manner by identifying a leaf node $N^k(r(1), \ldots, r(k))$ of the probability tree, this leaf node representing the state of the station on completion of a tournament, assuming that it performs all the selection rounds of this tournament. Indeed, identification of a leaf node $N^k(r(1), \ldots, r(k))$ makes it possible to determine the k values drawn r(1) to r(k) making it possible to culminate in the state represented by this leaf node. The behavior of the station is then entirely determined by the knowledge of the values r(1) to r(k).

Now, with each leaf node $N^k(r(1), \ldots, r(k))$ of the tree is associated the probability value $V_n^k(r(1), \ldots, r(k))$ according to the definition of the function $V_n^k$ given below, the sum of the probabilities $V_n^k(r(1), \ldots, r(k_{max}))$ associated with the leaf nodes of a tree being equal to 1.

Let Z be the total number of leaf nodes of the tree. A series of Z+1 index values $A_n^i$ belonging to the interval of real values [0,1[ for $0 \leq i \leq Z$, with $A_n^0=0$ and $A_n^Z=1$, is defined for each class of packets n to be processed. A partition of the interval of real values [0,1[ into Z disjoint sub-intervals $[A_n^i, A_n^{i+1}[$ is defined by means of the index values $A_n^i$, for $0 \leq i \leq Z$.

With each leaf node $N^k(r(1), \ldots, r(k))$ is associated, in the interval of real values [0,1], a sub-interval $[A_n^i, A_n^{i+1}[$ of length equal to $V_n^k(r(1), \ldots, r(k))$, that is to say such that $A_n^{i+1}=A_n^i+V_n^k(r(1), \ldots, r(k))$, the values $V_n^k(r(1), \ldots, r(k))$ being considered in the order in which the corresponding leaf nodes $N^k(r(1), \ldots, r(k))$ are ranked according to the order relation defined above: the first interval $[A_n^0, A_n^1[$ is associated with the smallest leaf node in the sense of this order relation, the second interval $[A_n^1, A_n^2[$ being associated with the second smallest leaf node, and so on and so forth, the last interval $[A_n^{Z-1}, A_n^Z[$ being associated with the last leaf node.

The management of the packet classes is therefore performed by associating with each packet class n a partition of the interval [0,1[ into Z sub-intervals $[A_n^i, A_n^{i+1}[$, and then by identifying the sub-interval of values in which the index value A assigned to the station having a packet to be sent lies, the binary values representative of the permissions/prohibitions to send being deduced thereafter from the identified sub-interval.

It should be noted that some of these sub-intervals may be of zero length when there exist leaf nodes $N^k(r(1), \ldots, r(k))$ such that $V_n^k(r(1), \ldots, r(k))=0$.

In the example represented in FIG. 6, the tree comprises Z=8 leaf nodes. With the class of packets n2 are associated the leaf nodes $N^3(1,1,0)$, $N^3(1,1,1)$, the other leaf nodes not being accessible.

The index values associated with class n2 are:

$A_{n2}^1 = A_{n2}^0 + V_{n2}^3(0,0,0) = 0$ since $V_{n2}^3(0,0,0) = 0$ $A_{n2}^2 = A_{n2}^1 + V_{n2}^3(0,0,1) = 0$ since $V_{n2}^3(0,0,1) = 0$ $A_{n2}^3 = A_{n2}^2 + V_{n2}^3(0,1,0) = 0$ since $V_{n2}^3(0,1,0) = 0$ $A_{n2}^4 = A_{n2}^3 + V_{n2}^3(0,1,1) = 0$ since $V_{n2}^3(0,1,1) = 0$ $A_{n2}^5 = A_{n2}^4 + V_{n2}^3(1,0,0) = 0$ since $V_{n2}^3(1,0,0) = 0$ $A_{n2}^6 = A_{n2}^5 + V_{n2}^3(1,0,1) = 0$ since $V_{n2}^3(1,0,1) = 0$ $A_{n2}^7 = A_{n2}^6 + V_{n2}^3(1,1,0) = 0.55$ $A_{n2}^8 = A_{n2}^7 + V_{n2}^3(1,1,1) = 1$ Likewise, with the class of packets n1 are associated the leaf nodes $N^3(0,0,0)$ $N^3(0,0,1)$, $N^3(0,1,0)$, $N^3(0,1,1)$, $N^3(1,0,0)$, $N^3(1,0,1)$, the other leaf nodes not being accessible.

The index values associated with class n1 are:

$A_{n2}^1 = A_{n2}^0 + V_{n1}^3(0,0,0) = 0.40425$ $A_{n2}^2 = A_{n2}^1 + V_{n1}^3(0,0,1) = 0.53900$ $A_{n2}^3 = A_{n2}^2 + V_{n1}^3(0,1,0) = 0.83888$ $A_{n2}^4 = A_{n2}^3 + V_{n1}^3(0,1,1) = 0.98000$ $A_{n2}^5 = A_{n2}^4 + V_{n1}^3(1,0,0) = 0.99220$ $A_{n2}^6 = A_{n2}^5 + V_{n1}^3(1,0,1) = 1$ $A_{n2}^7 = A_{n2}^6 + V_{n1}^3(1,1,0) = A_{n2}^6 = 1$ since $V_{n1}^3(1,1,0) = 0$ $A_{n2}^8 = A_{n2}^7 + V_{n1}^3(1,1,1) = A_{n2}^7 = 1$ since $V_{n1}^3(1,1,1) = 0$ A station, having to send a packet of class n1 to be sent, will determine an index value A by drawing a value of a uniform random variable taking its values in the interval of values [0, 1 [. The station determines the sub-interval $[A_n^i, A_n^{i+1}[$ in which the index value drawn lies by comparing A with the various values $A_n^i$, for $0 \le i \le Z$. Identification of the interval $[A_n^i, A_n^{i+1}[$ makes it possible to determine the leaf node $N_n^k$ $(r(1), \ldots, r(k))$ associated with this interval, on the basis of the order number i of the associated interval. On the basis of the identification of the leaf node, it is possible to deduce therefrom the sequence of values $r(1)$ to $r(k)$ on account of the construction of the tree.

In a practical manner, to facilitate the determination of these various elements, when the tree is constructed and the probabilities are assigned to the various nodes the values $V_n^k(r(1), \ldots, r(k))$ and $A_n^i$ are calculated, and then the sequence of values $r(1)$ to $r(k)$ and the associated interval of index values is stored in a table for each leaf node.

Figure 4:
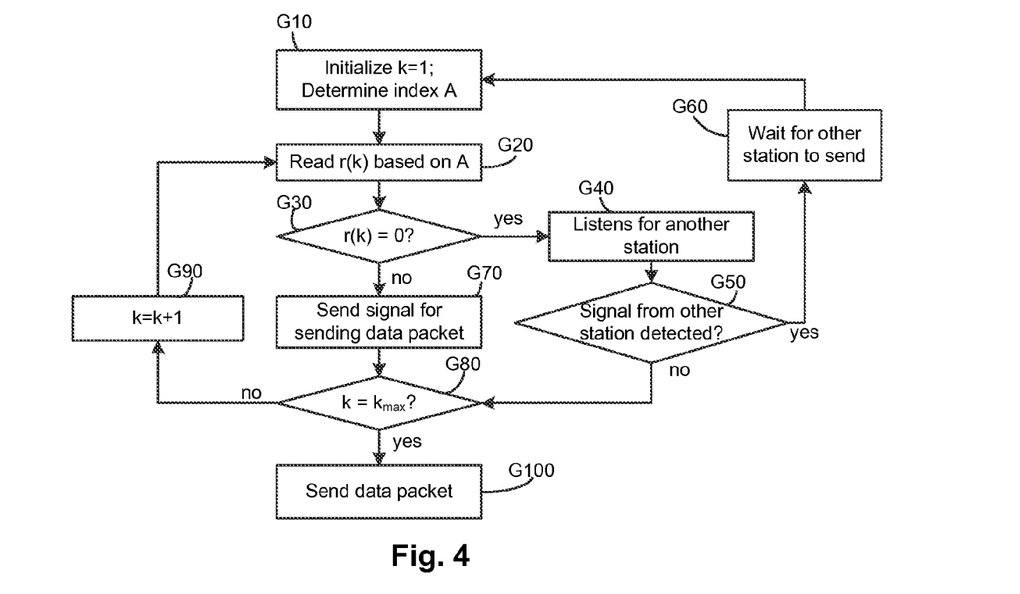
FIG. 4 represents, in flowchart form, the main steps of a method for regulating sending in accordance with the invention in a preferred embodiment.

The main steps G10 to G100 of a method for regulating sending according to the invention are described with reference to FIG. 4. This method also uses the tournament scheme, but some of steps F10 to F100 described previously are modified. It is assumed here that the class n assigned to a packet is coded by an integer value included in an interval of values $[N_{min}, N_{max}]$, for example [1, 8].

In the course of a first step G10, the station 10 initializes a variable k to the value 1, this variable representing the index of the current selection round.

During this same step G10, each station having a packet to be sent determines an index value A representative of the behavior of the station in the course of the tournament. More precisely, this index value A represents the probability that the station 10 is permitted to send a packet on completion of the tournament.

Taking into account the class n to which the packet to be sent belongs, the station determines the series of Z sub-intervals $[A_n^i, A_n^{i+1}[$ associated with this class n. The station thereafter determines the sub-interval $[A_n^i, A_n^{i+1}[$ in which the index value drawn lies, and then the sequence of values $r(1)$ to $r(k)$ which are allotted to it for the tournament. These values $r(1)$ to $r(k)$ are finally stored in memory by the station.

The way of determining the values $r(k)$ on the basis of a unique initial index value A which has just been described makes it possible to circumvent drawing a value $r(k)$ at each round of the tournament, since they can be deduced directly from the index value A drawn at the start, while guaranteeing that the distribution, between the stations, of the chances of sending is the same as that which would have been obtained by the actual drawing of a value based on the probabilities $p_n^k(r(1), \ldots, r(k))$ assigned to the various nodes $N^k(r(1), \ldots, r(k))$.

In step G20, the station reads in memory the value $r(k)$ associated with the current selection round.

The following steps G30 to G100 are identical to steps F30 to F100 described previously, with the exception of step G30 which uses, for the test aimed at determining which step must be executed after step G30, the value $r(k)$ obtained by calculation on the basis of the index value A drawn at the start, in replacement for the value $r(k)$ obtained by drawing a random variable value.

According to a variant embodiment, it is possible to choose different depths of tree according to the tree part. For example, the tree part assigned to class n1 could comprise only two depth levels, which would amount to deleting nodes $N^3(0,0,0), N^3(0,0,1), N^3(0,1,0), N^3(0,1,1), N^3(1,0,0), N^3(1,0,1)$ from this tree. The number of depth levels of the part of the tree assigned to a packet class is adjusted as a function of the quality of service requirements specific to this class. The number of depth levels may be increased for the classes for which one wishes to reduce the collision rate (and therefore the transmission error rate) or reduced for the classes for which it is preferable to send more rapidly despite the risk of collision. The maximum number $k_{max}$ of depth levels chosen for the tree determines the duration of the tournament, and therefore the duration of the time interval reserved for actual sending.

In the variable depth level case, the test of step G80 is replaced with a test consisting in verifying whether the node representing the current state of the station is a leaf node. In the affirmative, it is step G100 which is executed subsequent to step G80; in the converse case, it is step G90 which will be executed.

The invention furthermore makes it possible to implement various schemes for scheduling the emissions of packets as a function of their respective classes. Indeed, by defining in an appropriate manner, for each tournament or each phase of the selected scheduling scheme, on the one hand, the intervals of index values and, on the other hand, the association between these intervals of index values and the classes that may be used, it is possible to implement a particular scheduling scheme.

According to a first scheduling scheme, termed the strict priority scheme, a first data packet, belonging to a class n1, to be processed with a lower priority level than that with which the class n2 to which a second packet belongs has to be processed, is always sent after the second packet. Stated otherwise, a station having to send packets of class n1 will have to wait until the stations having packets of class n2 have finished sending their packets in order to be able to send in its turn.

In such a situation, a series of sub-intervals $[A_{n1}^i, A_{n1}^{i+1}[$, respectively $[A_{n2}^i, A_{n2}^{i+1}[$, is assigned to class n1, respectively n2, each of these series corresponding to a partition of the interval [0, 1[. With class n2, associated with the highest priority level, are associated the rightmost leaf nodes of the tree (the highest leaf nodes in the sense of the order relation defined above). Furthermore the lengths of some of the sub-intervals $[A_{n1}^i, A_n^{i+1}[$ are chosen zero so as to prohibit a packet class from accessing the states represented by the leaf nodes associated with these intervals of zero length.

The various series of sub-intervals thus predefined are used during a tournament by a station as a function of the membership class of the packet to be sent.

According to a second scheduling scheme, termed the circular scheduling scheme, better known by the term "Round Robin", one and the same frequency of access to the network is assigned to each of the packet classes. Such a scheme consists, in a known manner, in performing, after each sending period—which period corresponds to one or more tournaments—, a rotation so that the level of priority processed by priority changes each time.

Let us assume for example that there exist in total 3 packet classes n1, n2, n3. During the first tournament, class n1 is processed by priority with respect to class n2, which is itself processed by priority with respect to class n3. In this case, we write n1>n2>n3. In the next tournament, it will be class n2 which will be processed by priority with respect to class n3, which is itself processed by priority with respect to class n1. We therefore have n2>n3>n1. During the next tournament, we will have n3>n1>n2.

The scheduling scheme therefore comprises three different phases. These three phases will be managed appropriately by defining for each of them a probability tree and by determining a series of sub-intervals $[A_n^i, A_n^{i+1}[$ for each packet class and each phase.

According to a third scheduling scheme, termed the weighted circular scheduling scheme, better known under the term of "Weighted Round Robin" (WRR), the frequency of access to the network is different according to the priority levels, in general higher for the streams with high priorities.

Let us assume for example that there exist in total 3 packet classes n1, n2, n3. Using the previous notations, there will be for example 4 phases, denoted as follows:

n1>n3>n2
n2>n3>n1
n1>n2>n3
n3>n2>n1

These various phases will be managed appropriately by defining for each of them a probability tree and by determining a series of sub-intervals $[A_n^i, A_n^{i+1}[$ for each packet class and each phase, which phase corresponds to one or more tournaments. The order of succession of the phases can be modified in a dynamic manner, according to the class of station having sent in the previous round. In this case, the series of sub-intervals $[A_n^i, A_n^{i+1}[$ used by a station during a tournament will be dependent on the class of station having sent in the previous round.

The mechanism for regulating sending proposed by the invention is compatible with the implementation provided for in the current standard. Indeed, it suffices to provide that certain DIFS periods (for example one period out of two) use will be made of the mechanism in accordance with the current IEEE 802.11 standard, while for the other periods use will be made of the mechanism according to the invention. It is thus possible to guarantee cohabitation and sharing of access to the radio medium between stations in accordance with the IEEE 802.11 standard and stations using the mechanism according to the invention, the latter stations benefiting from the advantages in terms of bandwidth sharing which have been described.

It is possible to guarantee that no station in accordance with the IEEE 802.11 standard sends while a tournament is taking place between the stations implementing the invention by preventing the occurrence of silence periods of duration DIFS in the course of the tournament. It suffices for example to delete any leaf node $N^k(r(1), \ldots, r(k))$ for which there exist at least M consecutive values r(i), r(i+1), ..., r(i+M) equal to zero where M is equal to the duration of the period DIFS divided by the duration of a selection round, the value of M being rounded to the integer immediately above. Furthermore, the tournament will start slightly before the end of the period DIFS and the stations, implementing the invention, will send a signal through the network so as to prevent the other stations, that are not in accordance with the invention, from beginning to send if they detect an absence of signal.

The invention affords a simple and effective solution for managing various priority levels in a wireless telecommunication network. It allows account to be taken of various priority levels and an equitable sharing of access to the radio medium according to a distribution mechanism based on a probabilistic scheme which takes into account all the priority levels of the packets to be sent. The sharing of access to the radio medium is performed in an optimal manner, statistically speaking, whatever scheduling scheme is chosen for the management of various priority levels, in particular the management of packet class. It is thus possible to guarantee a quality of service, and to do so without having to implement a technique with centralized control of sending.

According to a particular embodiment of the invention, a scheduling scheme of Round Robin type is implemented between stations having to send packets and belonging to one and the same class of packets n.

According to what was described above, choosing a series of binary values $r(j)$, $j \in \{1, \ldots, k\}$, representative of permission or of prohibition to send during a tournament for a given class n, is equivalent to randomly drawing these values with a probability $V_n^k(r(1), \ldots, r(k))$. And this is equivalent to randomly drawing a variable A in the interval [0,1[ and to associating leaf number i with A such that the interval $[A^i, A^{i+1}[$ contains A, the intervals $[A^i, A^{i+1}[$ forming, as already explained above, a partition of the interval [0,1[ associated with the packet class considered.

In this embodiment, the station 10 randomly draws the index value A in the interval [0,1[ and keeps the value A in memory until the end of the tournament. At the end of the tournament, a leaf node $N^k(r(1), \ldots, r(k))$ is attained, subsequent to which the station or stations having won the tournament will send. By listening to the signals sent, the station 10 can determine the series of values $r(1), \ldots, r(k)$ which made it possible to attain the winning leaf node $N^k(r(1), \ldots, r(k))$ and is therefore able to identify this corresponding winning leaf node.

If the winning leaf node does not belong to the set of leaf nodes that can be attained by a station having to send a packet of class n, then the station 10 will use for the next tournament the index value A that it has in memory instead of randomly drawing a new index value.

If conversely the winning leaf node belongs to the set of leaves that can be attained by the class n, then the station can determine the order number i and therefore the interval $[A^i, A^{i+1}[$ which is associated with this winning leaf node. Subsequent to which the station 10, if the packet which has been sent has not collided, replaces in its memory the value A with a new index value A' calculated as follows:

$$A' = A + 1 - A_i \text{ if } A < A_i$$

$$A' = A - A_i \text{ if } A \geq A_i.$$

This operation consists in performing a circular permutation on the interval [0,1[ of length $1-A_i$. It is this new updated index value A' that the station 10 will use for the next tournament instead of randomly drawing a value in the interval [0,1[. In this way, the index value assigned to a station during the next tournament is deduced from the index value assigned to this same station during the current tournament, and not drawn at random like that assigned to the station during the first tournament.

If at the end of the tournament a station 10 wins the tournament but its send collides with another station's send, then this station 10 may not change the value A that it has in memory in the manner which has just been indicated. It may in this case for example randomly draw a new index value A' which it stores in memory. If conversely there has been a collision, but the station 10 has not sent, it may either—according to a first alternative—draw a new value of A, or—according to a second alternative—update the index value A as if the send had been successful.

This embodiment allows the stations to each send in their turn, each station sending in turn tournament after tournament, except in the case of a collision during a tournament. It is particularly appropriate for the transmission of data streams conveying voice, because it a quality of service for the various stations of one and the same class by serving these stations equitably.

It may be pointed out that the circular permutation thus implemented preserves the order of the quantities A in memory in the stations sending packets of class n and which did not send in the previous round. A station having sent successfully finds itself with the smallest value in memory and will therefore choose the smallest leaf during the next tournament. These last two properties make it possible to serve the stations wishing to send a packet of class n in Round Robin mode as long as a collision does not occur. Finally a circular permutation such as this does not modify the statistical distribution of the index values A which continue to be distributed uniformly over [0,1[, thereby guaranteeing that the leaves will be chosen with probabilities which make it possible to minimize the collision rate.

This inter-station scheduling scheme of Round Robin type is of course also usable when there is a single packet class. This makes it possible to envisage using it independently of the class management described above, since, in this case, all the packets will be processed in the same manner, without consideration of their membership class.

With this in mind, the invention also relates to a second method for regulating sending implemented by a station having at least one data packet to be sent via a wireless communication network, the method comprising at least one step G20 of obtaining a binary value representative either of a permission to send, or of a prohibition to send, a step G100 of sending said packet, said sending step being executed on condition that at least one criterion relating to the binary value or values obtained is satisfied, in which method the binary value or values are deduced from an index value assigned to said station for a tournament comprising the execution of at least one obtaining step G20 and the sending step G100, the index value A' assigned to said station during a tournament following a current tournament being deduced from the index value A assigned to said station during the current tournament so that the stations having to send a packet send in turn.

In such a method, only the first index value assigned to a station is obtained by random drawing of a value in a predefined interval of values.

According to a particular embodiment of this second method, when during said current tournament another station has sent at least one packet without there having been any collision, the index value A' is deduced from said index value A as follows:

$$A'=A+1-A_i \text{ if } A<A_i$$

$$A'=A-A_i \text{ if } A \geq A_i$$

where the interval $[A_i, A_{i+1}[$ is the interval of index values which is associated with this other station, having sent a packet.

Such a regulating method therefore makes it possible to regulate access to the transmission medium according to an inter-station scheduling scheme of Round Robin type, while minimizing the collision rate.

Correlatively, the invention also relates to a device comprising means for implementing this second method, as well as a computer program for the implementation of this second method and a record carrier readable by a data processor on which such a program is recorded.

ANNEX

CHART 1

| Node | Probability | Value |
|---|---|---|
| $N^0$ | $p_n^0$ | 0.02 |
| $N^1(0)$ | $p_n^1(0)$ | 0.45 |
| $N^1(1)$ | $p_n^1(1)$ | 0.50 |

CHART 1-continued

| Node | Probability | Value |
|---|---|---|
| $N^2(0,0)$ | $p_n^2(0,0)$ | 0.25 |
| $N^2(0,1)$ | $p_n^2(0,1)$ | 0.32 |
| $N^2(1,0)$ | $p_n^2(1,0)$ | 0.39 |
| $N^2(1,1)$ | $p_n^2(1,1)$ | 0.45 |

CHART 2

| Node | Probability | Value |
|---|---|---|
| $N^0$ | $V_n^0$ | 1 |
| $N^1(0)$ | $V_n^1(0)$ | 0.98 |
| $N^1(1)$ | $V_n^1(1)$ | 0.02 |
| $N^2(0,0)$ | $V_n^2(0,0)$ | 0.539 |
| $N^2(0,1)$ | $V_n^2(0,1)$ | 0.441 |
| $N^2(1,0)$ | $V_n^2(1,0)$ | 0.010 |
| $N^2(1,1)$ | $V_n^2(1,1)$ | 0.010 |
| $N^3(0,0,0)$ | $V_n^3(0,0,0)$ | 0.40425 |
| $N^3(0,0,1)$ | $V_n^3(0,0,1)$ | 0.13475 |
| $N^3(0,1,0)$ | $V_n^3(0,1,0)$ | 0.29988 |
| $N^3(0,1,1)$ | $V_n^3(0,1,1)$ | 0.14112 |
| $N_n^3(1,0,0)$ | $V_n^3(1,0,0)$ | 0.00610 |
| $N^3(1,0,1)$ | $V_n^3(1,0,1)$ | 0.00390 |
| $N^3(1,1,0)$ | $V_n^3(1,1,0)$ | 0.00550 |
| $N^3(1,1,1)$ | $V_n^3(1,1,1)$ | 0.00450 |

The invention claimed is:

1. A method for regulating sending of data packets, implemented by a station having at least one data packet to be sent via a wireless communication network, the method comprising:
    a step of assigning an index value randomly to said station at the beginning of a tournament comprising selection rounds, wherein the index value is representative of the station's behavior during the tournament,
    at least one step of obtaining, for a selection round of said tournament, a binary value based on a function of the index value, wherein the binary value is representative of either a permission to send, or a prohibition to send, the binary value is allocated to said station for said selection round, and
    a step of sending said at least one packet, said sending step being executed on condition that at least one criterion relating to the obtained binary value is satisfied,
    wherein the binary value is dependent on said index value assigned randomly to said station and on a packet class to which said at least one packet to be sent belongs.

2. The method as claimed in claim 1, wherein said index value is determined by drawing a value of a random variable taking its values in a common interval of index values shared by all packet classes.

3. The method as claimed in claim 1, further comprising a step of identifying, from a list of sub-intervals of values which is associated with said packet class, a sub-interval of values in which said index value lies and based on which the binary value is determined.

4. The method as claimed in claim 3, wherein a priority level is assigned for a given time period to said packet class, the list of sub-intervals of values which is associated with said class being dependent on the priority level customarily assigned to said class.

5. The method as claimed in claim 1, wherein the binary value is calculated using an initial index value A assigned to said station for a current tournament comprising the execution of said at least one obtaining step and the sending step, the initial index value A representing a probability that said station is permitted to send a data packet on completion of the current tournament, and a new index value A' assigned to said station during a tournament following the current tournament is deduced from the initial index value A assigned to said station during the current tournament so that stations having to send a packet belonging to said class send in turn.

6. The method as claimed in claim 5, wherein, when during said current tournament another station has sent at least one packet without any collision, said new index value A' is deduced from said initial index value A as follows:

$A'=A+1-A_i$ if $A<A_i$ $A'=A-A_i$ if $A \geq A_i$ where the interval $[A_i, A_{i+1}[$ is the interval of index values which is associated with said another station.

7. A device for regulating sending for a station having at least one data packet to be sent via a wireless communication network, the device comprising:

a processor that assigns an index value randomly to said station at the beginning of a tournament comprising selection rounds, wherein the index value is representative of the station's behavior during the tournament, and determines, for a selection round of said tournament, at least one binary value based on a function of the index value, wherein the binary value is representative of either a permission to send, or a prohibition to send, the binary value is allocated to said station for said selection round, and a network access module configured to send a packet on condition that at least one criterion relating to the obtained at least one binary value is satisfied, wherein the processor is configured to determine the at least one binary value as a function of said index value assigned randomly to said station and of a packet class to which the packet to be sent belongs.

8. A non-transitory computer program product comprising a computer readable medium having a computer readable program code embodied therein, said computer readable program code implements the method as claimed in claim 1 when said program code is executed by a data processor.

* * * * *